United States Patent [19]
Stickler

[11] Patent Number: 5,529,648
[45] Date of Patent: Jun. 25, 1996

[54] HETEROGENEOUS FUEL FOR HYBRID ROCKET

[75] Inventor: David B. Stickler, Carlisle, Mass.

[73] Assignee: Aerodyne Research, Inc., Billerica, Mass.

[21] Appl. No.: 173,363

[22] Filed: Dec. 23, 1993

[51] Int. Cl.$^6$ .................................................. C06B 45/10
[52] U.S. Cl. ........................ 149/19.1; 149/19.4; 149/19.5; 149/19.6
[58] Field of Search ................. 149/17–20; 60/201–209, 60/211–219; 102/101–109

[56] References Cited

U.S. PATENT DOCUMENTS

| | | | |
|---|---|---|---|
| 3,377,955 | 4/1968 | Hodgson | 102/102 |
| 3,703,080 | 11/1972 | Longwell | 60/219 |
| 3,744,427 | 7/1973 | Good et al. | 102/100 |
| 3,793,099 | 2/1974 | Duerksen et al. | 149/19 |
| 3,931,040 | 1/1976 | Breazeale | 252/188.3 R |
| 4,790,891 | 12/1988 | Halliday et al. | 149/2 |
| 4,882,395 | 11/1989 | Ahad | 525/407 |
| 5,049,212 | 9/1991 | Colick | 149/3 |
| 5,339,624 | 8/1994 | Calsson et al. | 60/207 |

*Primary Examiner*—Charles T. Jordan
*Assistant Examiner*—J. R. Hardee
*Attorney, Agent, or Firm*—Cesari and McKenna

[57] ABSTRACT

Heterogeneous fuel compositions suitable for use in hybrid rocket engines and solid-fuel ramjet engines, The compositions include mixtures of a continuous phase, which forms a solid matrix, and a dispersed phase permanently distributed therein. The dispersed phase or the matrix vaporizes (or melts) and disperses into the gas flow much more rapidly than the other, creating depressions, voids and bumps within and on the surface of the remaining bulk material that continuously roughen its surface, This effect substantially enhances heat transfer from the combusting gas flow to the fuel surface, producing a correspondingly high burning rate, The dispersed phase may include solid particles, entrained liquid droplets, or gas-phase voids having dimensions roughly similar to the displacement scale height of the gas-flow boundary layer generated during combustion.

35 Claims, 4 Drawing Sheets

HETEROGENEOUS FUEL FOR HYBRID ROCKET

This invention was made with Government support under contract NAS3-26914 awarded by NASA. The Government has certain rights in this invention.

BACKGROUND OF THE INVENTION

1. Field of the Invention

The present invention relates to rocket and ramjet fuel compositions, and more particularly to fuel compositions suitable for use in so-called "hybrid" propulsion rocket engines.

2. Description of the Related Art

As a result of intensive research efforts, rocket engines have undergone significant evolution since the first aerospace vehicles were launched several decades ago. Practitioners have progressively improved engine designs to achieve better performance and safety characteristics, and have also succeeded in simplifying engine constructions for ease of production. Traditional solid-propellant engines, for example, pose safety hazards both in manufacture and operation, owing to the intimate bulk combination of the fuel composition and an oxidant to promote its combustion. Such engines also suffer from performance limitations, and their propellant systems often contain ingredients that contribute to atmospheric pollution.

Liquid-propellant devices, in which fuel and oxidant are separately stored as liquids and sprayed simultaneously into a combustion chamber, can deliver improved performance over solid-propellant engines. However, due in part to the need for precise control over the rate at which fuel and oxidant are introduced, liquid-propellant rocket engines are highly complex to produce and also to maintain. Their intricacy increases the potential for malfunction and safety hazard.

A recent improvement over these traditional solid- and liquid-propellant approaches is the "hybrid" engine, which utilizes both solid and liquid (or gaseous) components. Typically the solid component is a polymeric fuel, and is used in conjunction with a liquid or gaseous oxidizing component (most frequently a liquid that may be introduced as an easily vaporized spray); this model will be assumed for purposes of discussion. Hybrid designs offer numerous advantages. Properly engineered hybrid rocket engines, though simple in construction, are capable of delivering high thrust levels. Separation of fuel and oxidant components promotes safety, and the need to convey only one component into the combustion chamber reduces the regulatory and conduction hardware necessary for operation.

FIG. 1 schematically illustrates the hybrid concept, which includes a pressure casing or shell 10 (fabricated from, for example, a graphite/epoxy composite) that terminates in a nozzle 12, through which exhaust gases are ejected to provide thrust. Within casing 10 and generally conforming to its interior dimension is a continuous cake of solid fuel 14, which is hollowed out to define a combustion chamber or conduit 16 where burning takes place.

A source 20 of oxidant, which may be, for example, liquid oxygen, is introduced into combustion chamber 16 by means of an injector (not shown). The flow of oxidant is controlled by a valve 22. Combustion proceeds by vaporization of the solid fuel and, if a liquid oxidant is used, vaporization of that component as well. A mixture of the vapor-phase fuel and oxidant combusts near the surface 26 of solid fuel cake 14, and the gas flow over solid surface 26 develops a boundary layer with a velocity and temperature distribution that combine to transfer heat to the solid fuel, promoting further vaporization to continue combustion. The overall rate of the combustion process is limited by the rate at which heat is transferred to the solid fuel, since it is heat transfer that determines the vaporization rate.

These phenomena are illustrated diagrammatically in FIG. 2. The rate $ds/dt$ at which solid fuel is consumed (and which, assuming an annular fuel cross-section, is proportional to the rate at which the diameter of combustion chamber 16 linearly increases) depends on the heat-transfer rate $dQ/dt$ into solid fuel cake 14. The heat-transfer rate, in turn, is determined by the velocity and temperature profiles of the boundary layer along surface 26. As shown in the figure, the velocity profile v (where the ordinate represents increasing distance D from solid fuel cake 14 and rightward movement along the abscissa corresponds to increasing velocity) follows a standard turbulent flow pattern, with gases nearly stagnant close to surface 26. The temperature profile T (where rightward movement along the abscissa corresponds to increasing temperature) reaches a maximum at a characteristic value of D. The flow of fuel vapor from the solid surface serves to increase this distance and to increase the thickness of the velocity boundary layer, with the effect of constraining the rate of heat transfer $dQ/dt$ into the solid fuel cake 14.

One clear disadvantage of the hybrid concept results from the low linear burning rate $ds/dt$ inherent to vaporization of a simple polymeric fuel in a combusting boundary-layer flow, which constrains the maximum achievable thrust. Rocket engine thrust is proportional to the product of the exhaust mass flow rate and the exhaust velocity. The latter quantity is largely defined by the chemical compositions of the fuel and the oxidant, and reaches a maximum value at a characteristic ratio of fuel to oxidant. The mass flow rate is the sum of oxidant and fuel flows and, for a fixed ratio of fuel to oxidant, is determined by the mass burning rate of the fuel. In a hybrid rocket this mass burning rate is proportional to the product of fuel density, the exposed surface area 26, and the linear burning rate $ds/dt$.

The fuel density is fixed by its chemical composition. Therefore, improving the mass flow rate to increase thrust requires expansion of the exposed fuel surface area and/or the linear burning rate. Because conventional polymeric hybrid fuels burn at relatively low linear rates, engineering efforts have focused on ways of increasing the surface area. For example, one current high-thrust hybrid rocket development effort utilizes a "wagon-wheel" fuel grain design with more than 12 axial ports to obtain adequate burning surface area. Kniffen, R. J., "Hybrid Rocket Development at the American Rocket Company," 26th Joint Propulsion Conference, AIAA 90-2762, July 1990. Such complex solid fuel geometries impose high fabrication costs, large inert rocket-engine mass, and overall propulsion-system performance levels that fall well below theoretical limits.

DESCRIPTION OF THE INVENTION

Objects of the Invention

Accordingly, it is an object of the present invention to provide a form of solid fuel that burns at appreciably higher rates than conventional fuels.

It is another object of the invention to provide a form of solid fuel suitable for use in a simple hybrid rocket engine.

It is a further object of the invention to provide a hybrid rocket fuel that is easily prepared, cast and stored without inherent explosion hazard.

It is still another object of the present invention to provide a solid fuel that generates high exhaust velocity when combusted with a conventional hybrid-rocket oxidant.

Yet another object of the invention is to provide a solid fuel which, when combusted with a convention hybrid-rocket oxidant, generates an exhaust flow that does not contain atmospheric contaminants such as halogen compounds or metal-oxide particles.

Still another object of the invention is to provide a solid fuel that delivers a controlled distribution of burning rates over the linear length of the fuel charge and throughout its burning duration.

Other objects will, in part, be obvious and will, in part, appear hereinafter.

The invention accordingly comprises a solid fuel composition possessing the features and properties described herein and as exemplified in the combination of elements and ingredients set forth in the following summary and detailed description, and the scope of the invention will be indicated in the claims.

BRIEF SUMMARY OF THE INVENTION

Conventional practice in the formulation of solid fuels and propellants has emphasized a high degree of solid-phase, physical homogeneity. Relatively homogeneous solid propellants have been found to provide good combustion performance and adequate burn rates over a relatively wide range of applications, including various rocket-engine designs. Typical of the latter are polymeric binders loaded with crystalline ammonium perchlorate, metallic aluminum, and other additives that may be harmful to the planetary environment. (While this type of formulation is chemically heterogeneous, as contrasted with compositions in which fuel and oxidant are present in a single molecular structure [e.g., nitro-organics], its scale of physical heterogeneity is typically quite small, on the order of 100 microns or less.) Similarly homogeneous fuels, usually solid polymers or copolymers, have been chosen for use as hybrid rocket fuels.

I have found, however, that by utilizing compositions that exhibit far more pronounced physical heterogeneity, it is possible to achieve a high rate of heat transfer to large exposed fuel surface areas by creating a rough surface that persists even as the fuel burns.

The fuel compositions of the present invention typically include mixtures of a continuous fuel phase, which forms a solid matrix, and a dispersed fuel phase permanently distributed therein. Either of these basic elements may consist of more than one chemical component, and the singular term "phase" as used herein connotes both single-component phases and those that include more than one component. They are chosen such that either the matrix or filler component vaporizes (or melts) and disperses into the gas flow much more rapidly than the other, creating depressions, voids and bumps within the remaining bulk material that continuously roughen its surface. This effect substantially enhances heat transfer from the combusting gas flow to the fuel surface, producing a correspondingly high burning rate.

The present invention broadly includes heterogeneous mixtures of components differing in their vaporization or sublimation properties so as to produce a continuously roughened surface during combustion, with the scale of the rough features being comparable to the transport scale of the combusting gas flow over the fuel surface. The invention also includes other approaches to maintaining a rough surface during burning, including incorporation of metal shards or fragments within a continuous fuel phase; use of a single phase (which may include multiple constituents) having a volume fraction of bubbles or voids entrained therein; and dispersion of an immiscible or encapsulated liquid within the fuel matrix.

The approach of the present invention is applicable not only to hybrid rocket fuels, but to air-breathing solid-fueled ramjets and similar systems as well.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE PREFERRED EMBODIMENTS

Figure 1:
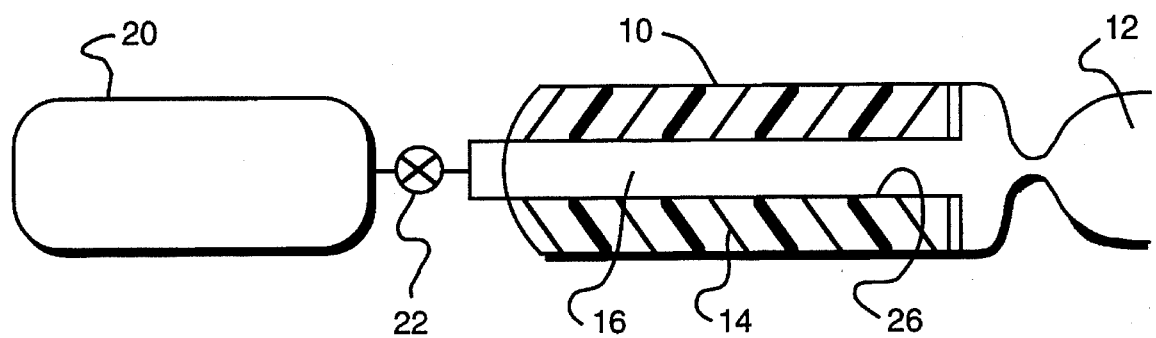
FIG. 1 is a sectional schematic view of a conventional hybrid rocket engine.
Figure 2:
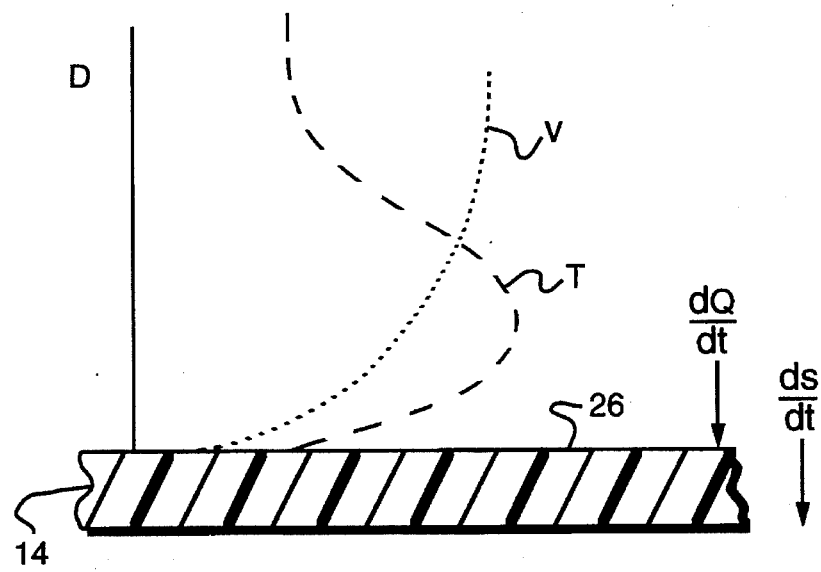
FIG. 2 graphically illustrates typical velocity and temperature profiles associated with combustion of hybrid rocket fuel.
Figure 3:
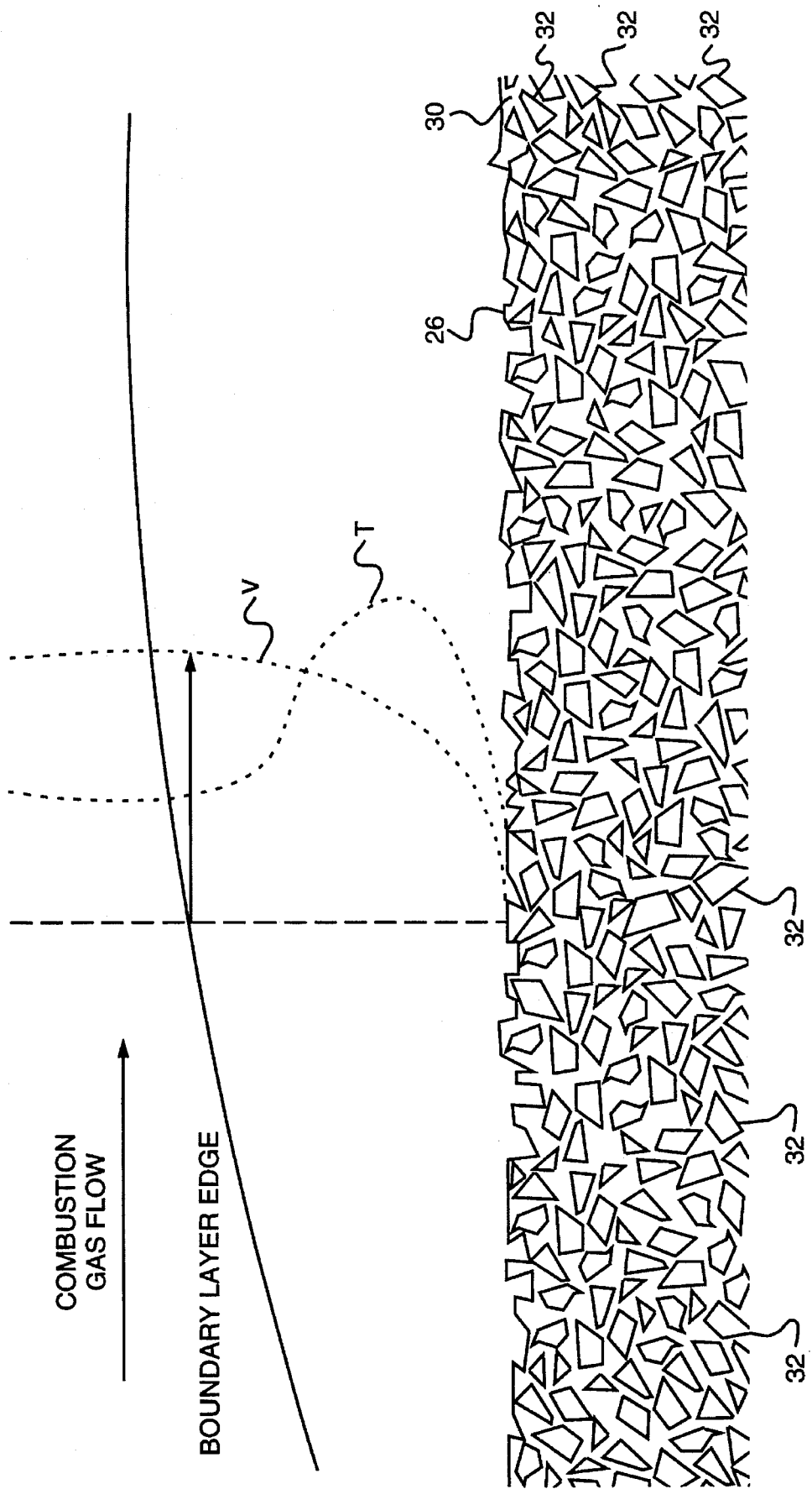
FIG. 3 is an enlarged sectional view of a representative fuel composition in accordance with the present invention, showing velocity and temperature profiles that result from combustion.

Refer first to FIG. 3, which illustrates the preferred embodiment of the present invention. The depicted fuel material includes a continuous phase 30, which forms a solid matrix, and a dispersed particulate phase 32 permanently distributed therein. Continuous phase 30 and dispersed phase 32 vaporize (or melt) and enter into the flowing gas phase (defined by the boundary layer edge) at different rates during combustion. It is not critical to the present invention which component disperses more rapidly. Furthermore, as noted above, both phases can include multiple constituents, depending on the particular application and desired performance characteristics.

Continuous phase 30 is preferably a combustible polymeric material such as polymethylmethacrylate, polybutylmethacrylate, polystyrene, polybutadiene, hydroxy-terminated polybutadiene (HTPB), polyethylene, polypropylene, polyurethane, polybutadiene-acrylonitrile copolymer, or copolymers, terpolymers, or higher-order polymeric combinations (hereafter denoted generically as copolymers) of these or similar materials. A polymeric material provides high physical strength, which allows the fuel material to be physically self-supporting within the pressure shell of the rocket engine. This eliminates the need for stiffening, strengthening or retention structures that might otherwise be necessary for support against gravitational, handling and launch forces. However, it is also possible to employ solid nonpolymeric organic compounds such as anthracene, naphthacene or chrysene; or mixtures of two or more such compounds, e.g., combinations of a high molecular-weight paraffin, a solid solution of tetracyanoethylene and naphthalene, and/or one or more alkanes (straight-chain or isomeric) having 25 to 40 carbon atoms.

The dispersed-phase particles 32 are preferably comparable in size to the transport scale of the combusting gas flowing over the fuel surface 26. If the particles are too small, the rough features of surface 26 will not materially increase convective heat transfer to the gas boundary layer flow. I have found that particles on the order of 0.2 to 10 times the average displacement-scale height of the gas flow boundary layer established on surface 26 during combustion provide worthwhile performance characteristics; particularly advantageous results occur using particle sizes of 0.5 to 3 times the average height of the boundary layer displacement thickness. For most applications that thickness is approximately 1 to 2 mm. Accordingly, particles having a size (or average size if present in a distribution) of 0.1 to 5 mm in at least two dimensions are ordinarily preferred, with sizes of 0.2 to 2 mm being most useful.

In one version of this embodiment, matrix 30 exhibits a relatively lower burning rate than dispersed additive phase 32, which vaporizes, or melts and escapes from fuel surface 26 as a liquid spray, at a significantly more rapid rate than matrix 30. The use of a dispersed phase that is more easily volatilized than the continuous phase offers thermodynamic benefits as well as the convection enhancement that arises from a rough surface. The lower effective heat of vaporization of the dispersed phase relative to that of the continuous phase results in a net fuel-mixture vaporization rate which is higher than that of the continuous phase alone. This thermodynamic advantage is not obtained using a dispersed phase that is less easily volatilized than the continuous phase.

One preferred class of additive is crystalline organic materials, such as naphthalene, that exhibit a higher burn rate than does a polymer fuel. Other suitable crystalline organic compounds include tetracyanoethylene, dicyanofuroxan, and alkanes (straight-chain and isomeric) having 25 to 40 carbon atoms; although toxicity considerations do not favor use of tetracyanoethylene and dicyanofuran, any of the foregoing materials will provide advantageous performance, and may be used alone or in combination, for example, with naphthalene. Naphthalene is especially useful in that its melting point, about 80.2° C., is less than that of many useful continuous-phase polymers. Furthermore, the use of an endothermically decomposing material such as naphthalene precludes the formation of explosive compositions during the process of fuel mixing and processing, as well as avoiding this hazard in storage. The result is a substantial decrease, relative to traditional propellants, in the cost of fuel production, as well as in terms of hybrid rocket fabrication, storage, transport and use.

It is also possible, however, to use as the dispersed phase (or a constituent thereof) polymeric organic compounds, including, for example, polyethylene dispersed in a HTPB matrix or polybutadiene-acrylonitrile dispersed in a polyethylene matrix; or solid fuels with higher vaporization temperatures than that of the matrix material, for example, solid carbon (e.g., graphite) particles dispersed in a HTPB matrix; or exothermically decomposing filler materials such a pieces of traditional solid propellant (for example, a conventional combination of polymer binder with finely dispersed ammonium perchlorate, or a conventional nitroglycerin/nitrocellulose-based propellant) or glycidal azide polymer (in particulate form); or an organic explosive, such as HMX, RDX or trinitrotoluene; or an energetic organic compound containing up to 20% oxygen on a molar basis, such as dicyanofuroxan, dicyanofurazan or dinitrotoluene, where an "energetic" compound is defined as one that liberates sufficient heat upon decomposition to simpler, predominantly gas-phase species to sustain its own decomposition and generate hot product gases. Both energetic compounds and the exothermically decomposing materials discussed above are capable of self-sustained exothermic decomposition without additional oxidant supply. Although they require special handling, such materials can substantially augment the bulk fuel burn rate.

In a second version of this embodiment, matrix 30 exhibits a relatively higher burning rate than dispersed additive phase 32. For example, shards or fragments of a metal, such as aluminum, magnesium or an alloy, can be dispersed within the matrix 30. As the fuel burns, the metal fragments locally protrude from the surface of matrix 30, both roughening the surface and also conducting heat into the bulk polymer, thereby enhancing dQ/dt. Along similar lines, particles of a relatively slow-burning material, such as solid carbon, can be dispersed within matrix 30. These particles become exposed as the matrix burns around them, creating a rough surface with an enhanced convective heat transfer.

A key constraint regarding additives is compatibility with the continuous phase. At the simplest level, this requires only that the additive not dissolve or adversely impact the cure of the continuous phase. More broadly, the final composition must exhibit adequate processing, casting and physical characteristics, including a useful storage life.

If the melting point of an additive exceeds that of the continuous phase, it can be straightforwardly dispersed in a melt of the continuous phase, which is then solidified under conditions (e.g., with sufficient rapidity) to preserve the homogeneity of the dispersion. If, on the other hand, the melting point of an additive is less than that of the continuous phase, different dispersion strategies must be employed. For example, the additive can be sheared into a powdered form of the continuous phase, which is then cured into block form. Alternatively, the additive can be dispersed into a polymer or polymer precursor that is maintained in an uncured, liquid form or which has been substantially diluted with solvent; after dispersion is complete, the polymer is cured or the solvent driven off to form the continuous phase with the additive dispersed therein.

The quantity of additive dispersed in the continuous phase (that is, the additive loading fraction) is chosen primarily to optimize the performance characteristics of the final material within the limits of structural fuel integrity. However, secondary considerations such as cost, the ease of creating and maintaining an even dispersion (or a graded dispersion, as discussed below), and final fuel density also merit consideration. In general, the volume fraction is chosen such that the spacing scale of surface roughness during burning corresponds to 1 to 10 times the average displacement-scale height of the gas flow boundary layer edge established on surface 26 during combustion. A useful range of volume loading fractions is 0.3 to 0.8, which can be readily achieved using conventional process techniques.

Figure 4:
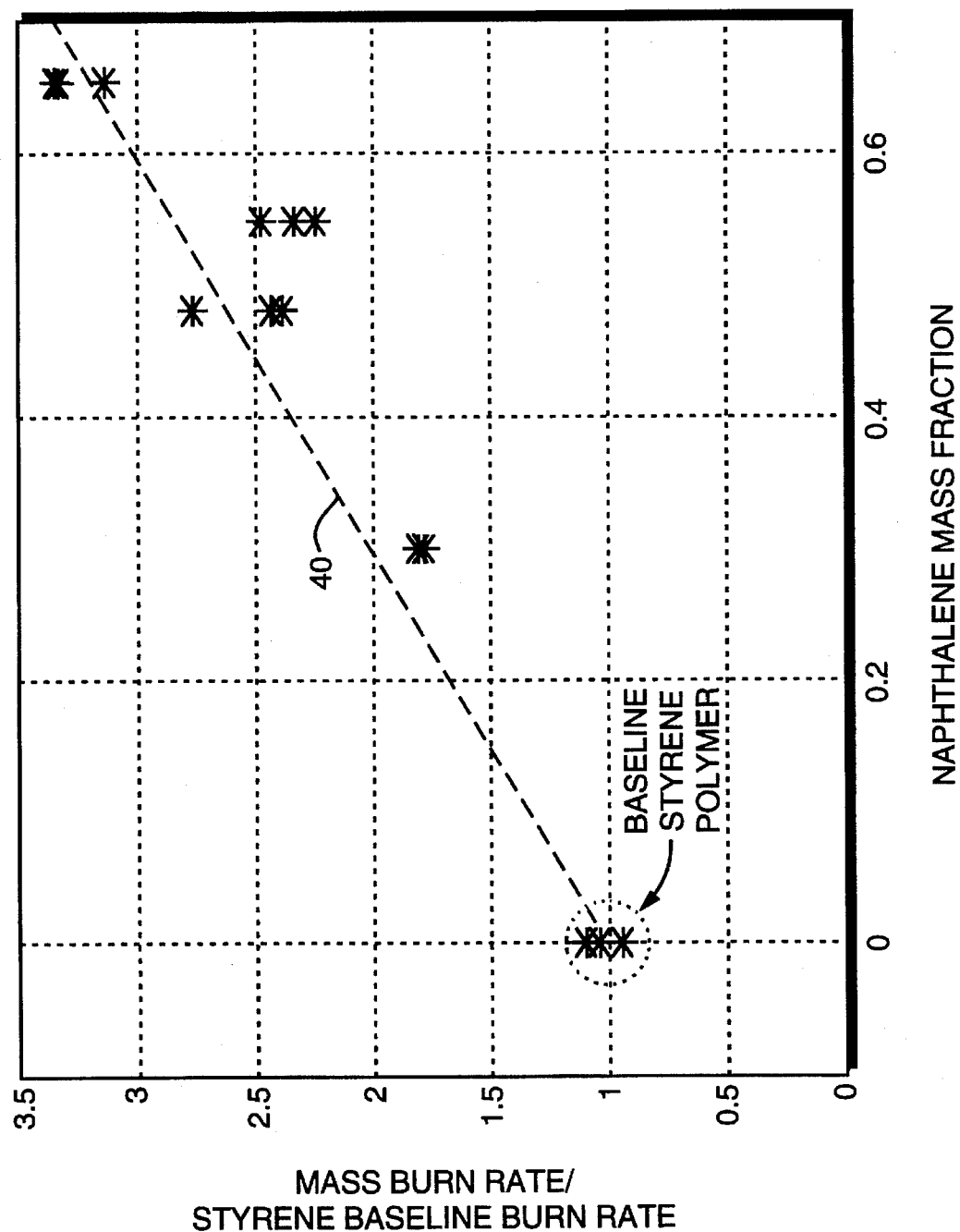
FIG. 4 graphically illustrates the effect of additive loading on burning rate.

FIG. 4 illustrates the measured effect on fuel burning rate of changes in the additive mass fraction. In this case the continuous phase was polystyrene and the dispersed phase particulate naphthalene having a size distribution of about 0.3 to about 1.5 mm. The fuel was combusted in the hot oxidizing gas flow of a torch burning methane with excess oxygen. In the illustrated graph, measured data points representing the mass burn rate observed with varying naphthalene mass fractions have been normalized to the mass burn rate of pure polystyrene.

The regression line 40 demonstrates the upward trend of the burn rate as a function of the naphthalene fraction. The highest fraction, 0.65, yielded a burn rate 3.3 times that of unmodified polystyrene. Notwithstanding the figure, which suggests continuous improvement in burn rate with increasing additive fraction, experience suggests a preferred fraction within the range 0.3 to 0.6. This range provides high burn rates while ensuring good structural integrity and straightforward dispersion.

Figure 6:
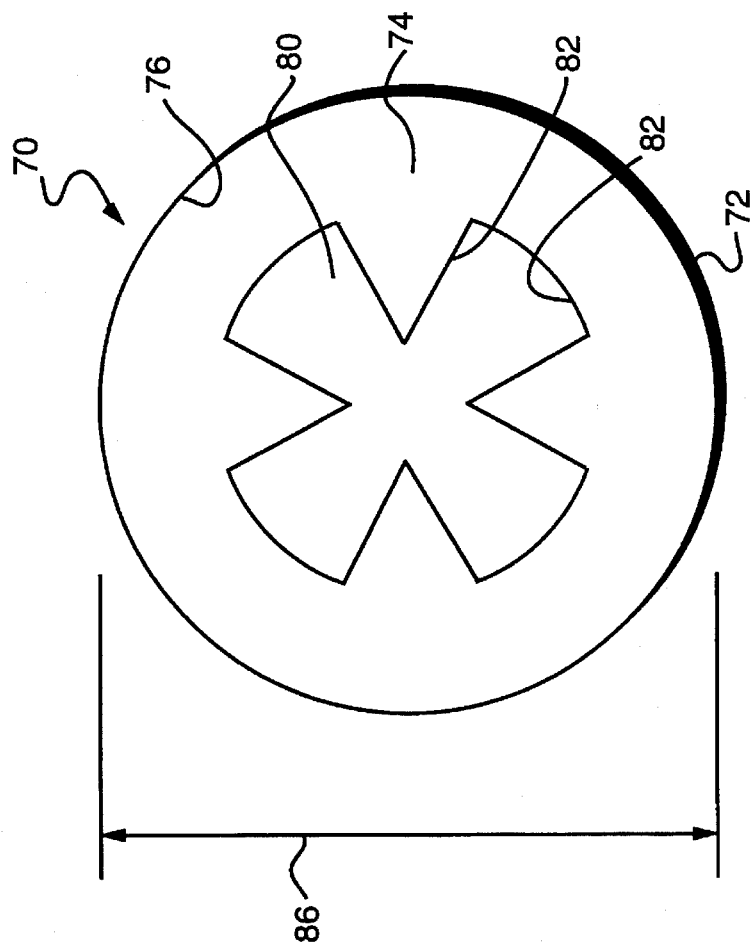
FIG. 6 is a cross-section of an engine design incorporating the present invention, and which provides the same mass burn rate as the engine shown in FIG. 5.
Figure 5:
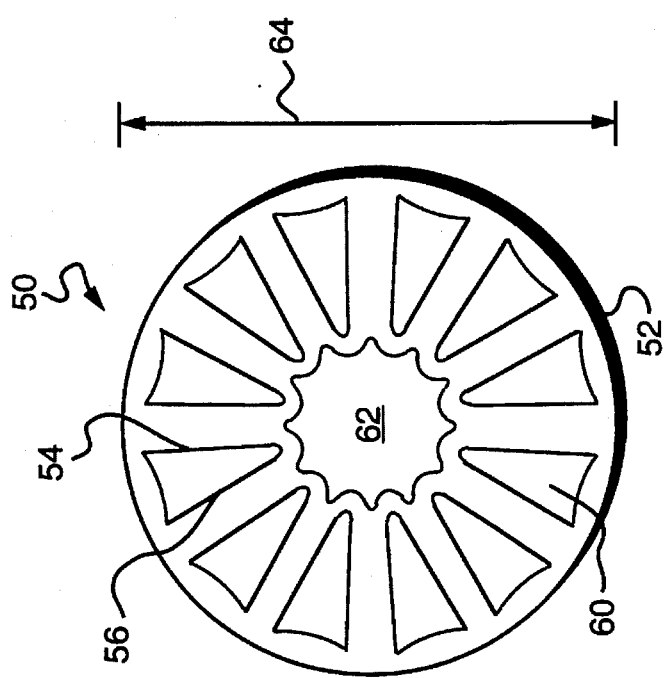
FIG. 5 is a cross-section of the wagon-wheel rocket engine discussed above.

Refer now to FIGS. 5 and 6, which together illustrate the benefits obtainable through use of the present invention. FIG. 5 shows the conventional wagon-wheel hybrid engine design discussed earlier. This rocket engine, indicated generally by reference numeral 50, includes an outer pressure casing 52 which contains the combustion gases and supports a conventional, polymeric solid fuel material 54 using a series of structural webs 56. The fuel is configured into 12 separate, parallel combustion channels representatively denoted by reference numeral 60 in order to provide a large exposed burning surface. Oxidant is delivered into each channel 60 at one end, and passes axially through the channel while combusting with the fuel 54. The engine also includes a central bore 62 which is structural in nature, supporting the webs 56; although central bore 62 occupies considerable engine volume, it does not conduct exhaust gases. The nominal diameter 64 of the engine 50 is approximately 192.5 cm.

FIG. 6 shows the degree to which the present invention can simplify the design of a hybrid rocket engine. The depicted engine 70 also includes an outer pressure casing 72 and a fuel material 74. However, fuel material 74 is a HTPB/naphthalene mixture containing a naphthalene mass fraction of 0.65; as noted above, this combination provides a burn rate 3.3 times greater than of unmodified polymer. Fuel material 74 completely lines the interior wall 76 of casing 72, and therefore requires no structural support. A single, continuous channel 80 of generally cruciform profile carries the exhaust gases, which are generated by combustion along the exposed surface 82 of fuel material 74. The nominal diameter 86 of the engine 70 is 177 cm.

The relatively simple engine 70 provides the same fuel mass burn rate as engine 50, yet requires no structural webs, contains no waste volume, and is more than 15% smaller (by volume) than engine 50. Engine 70, with its uncomplicated structure and physically smaller configuration, includes less inert weight relative to fuel weight than engine 50, and is far more easily and economically manufactured.

In a second embodiment of the invention, a solid fuel matrix is provided with a finite, and preferably large, volume fraction of internal voids or bubbles. In this case the average bubble size is preferably on the order of 0.2 to 10 times the average displacement-scale height of the gas flow boundary layer edge, and most preferably between 0.5 and 3 times the average height of the boundary layer displacement thickness. For most applications, bubbles having an average size of 0.1 to 5 mm are ordinarily preferred, with sizes of 0.2 to 1.5 mm being most useful. The volume fraction of bubbles preferably ranges from about 10% to about 25%, which ensures the persistence of an adequately rough surface during burning. However, it should be noted that incorporation of bubbles inevitably decreases the fuel bulk density, which adversely affects the mass burn rate and increases the physical scale of the pressure shell.

Bubbles may be generated by chemical liberation of gas from the polymer material or an additive. For example, a small quantity of water dispersed in a urethane pre-polymer liberates carbon dioxide as dispersed bubbles during the cure process. Introducing the water as a hydrate, e.g., of sodium carbonate, allows definition of a spatial dispersion scale of bubbles in the resulting polymer.

In a third embodiment, the dispersed phase 32 remains in a liquid state in the final fuel. This condition can be obtained either by encapsulating the liquid in a carrier, or by utilizing an immiscible liquid that is sheared into droplets and cured into the matrix. The latter approach may be implemented in the manner described above in connection with use of an additive whose melting point is below that of the matrix. The preferred average size of the encapsulated liquid or of the droplets is the same as that described above with respect to solid additives.

For example, dispersion of a low-solubility liquid in a polymer matrix can result in a relatively stable heterogeneous material. Glycol (1,2-ethanediol) dispersed in a matrix of HTPB represents one suitable combination. This combination can be produced by shearing a physical mixture of glycol and viscous HTPB pre-polymer to create a dispersion prior to casting, and then curing the fuel. In most cases involving dispersion of liquid droplets, an upper bound on the liquid volume fraction of about 30% is imposed by the requirement to maintain a continuous polymer matrix phase. Encapsulating the liquid in a shell, by contrast, allows a higher volume loading fraction and improves storage lifetime. An example of the latter is an HTPB matrix with a dispersion of approximately spheroidal shells of polypropylene-containing glycol. In this case, the polypropylene serves both to physically discretize the glycol during the mixing and curing process, and to provide a barrier to its diffusion into the matrix polymer in storage.

Convective heat transfer can be further enhanced by jetting gas into the boundary layer, thereby increasing the turbulence of the flowing combustion gases and enhancing convection. If the heterogeneous material 32 within matrix 30 evolves a volatile gas, this will escape as high-pressure jets into the boundary layer as the bubbles are exposed by burning. For example, since the fuel material is heated by internal conduction below the vaporizing surface as it burns, a dispersed phase of solid, liquid or gas may be melted and partially vaporized (or simply heated to increase its pressure) prior to its actual exposure at the burning fuel surface. The result is the jetting of gas (and possibly entrained liquid) without stressing the bulk fuel by extensive premature pressurization.

Any of the foregoing embodiments of the present invention can be used to address a performance limitation characteristic of hybrid rockets generally. In a hybrid engine, the local fuel burning rate is controlled by a combination of the local gas flow and the local fuel properties. For a spatially uniform fuel structure, the burning rate generally decreases toward the exit end of fuel charge. The burning rate also decreases with time as the fuel is consumed and the cross-section of the combustion conduit correspondingly increases. This longitudinal variation in the rate of fuel consumption ultimately results in incomplete utilization of the solid fuel charge, decreasing overall rocket performance. Furthermore, during operation, burn-rate variation alters the composition of the exhaust gases over time, lowering the exhaust velocity below a peak level.

By tailoring the spatial distribution and physical size of the dispersed phase over the length and across the thickness of the fuel charge, it is possible to compensate for these burn-rate variations. Grading the dispersed-phase loading level such that the highest additive concentrations occur toward the exit end of the fuel charge and toward its outer regions (i.e., those closest to the engine casing) counteracts the above-described negative effects on burn rate. Similarly, varying the size of the dispersed phase to concentrate larger particles or voids toward the exit end and outer regions of the fuel charge also counteracts the tendency of the burn rate to decrease over time, and it is possible to combine variations in additive size and concentration to achieve optimal results.

It will therefore be seen that the foregoing represents a highly advantageous approach to the formulation of solid rocket and ramjet fuels. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A heterogeneous solid fuel material comprising at least one combustible component defining a continuous solid polymeric matrix substantially free of oxidizer and, dispersed therein, at least one particulate component having an average size in at least two dimensions of 0.1 to 5 mm.

2. The solid fuel of claim 1 wherein the matrix is an organic polymer.

3. The solid fuel of claim 2 wherein the organic polymer is selected from the group consisting of polymethylmethacrylate, polybutylmethacrylate, polystyrene, polybutadiene, hydroxy-terminated polybutadiene, polyethylene, polypropylene, polyurethane, polybutadiene-acrylonitrile copolymer, and copolymeric combinations of monomeric constituents thereof.

4. The solid fuel of claim 2 wherein the organic polymer is a copolymer of at least two different monomers.

5. The solid fuel of claim 1 wherein the average size in at least two dimensions of the at least one particulate component is 0.2 to 2 mm.

6. The solid fuel of claim 1 wherein the matrix exhibits a lower effective heat of vaporization than at least one particulate component.

7. The solid fuel of claim 1 wherein the matrix exhibits a higher burning rate than at least one particulate component.

8. The solid fuel of claim 1 wherein the matrix exhibits a higher effective heat of vaporization than at least one particulate component.

9. The solid fuel of claim 8 wherein at least one particulate component is a crystalline organic compound that exhibits a higher mass burn rate than that of the matrix.

10. The solid fuel of claim 9 wherein the crystalline organic compound is naphthalene.

11. The solid fuel of claim 10 wherein the matrix is polystyrene.

12. The solid fuel of claim 9 wherein the crystalline organic compound is tetracyanoethylene.

13. The solid fuel of claim 8 wherein at least one particulate component is an exothermically decomposing material.

14. The solid fuel of claim 13 wherein the exothermically decomposing material is glycidal azide polymer.

15. The solid fuel of claim 1 wherein at least one particulate component is a solid metal.

16. The solid fuel of claim 15 wherein the metal is aluminum.

17. The solid fuel of claim 15 wherein the metal is an alloy of at least two metals.

18. The solid fuel of claim 15 wherein the metal is a physical mixture of at least two metals.

19. The solid fuel of claim 7 wherein at least one particulate material is solid carbon.

20. The solid fuel of claim 1 wherein the fuel has an exposed surface and is employed in a combustion process that generates a velocity boundary layer having an average boundary layer displacement thickness over said exposed surface, the average size of the at least one particulate component being 0.2 to 10 times said thickness.

21. The solid fuel of claim 1 wherein the fuel is has an exposed surface and is employed in a combustion process that generates a velocity boundary layer having an average boundary layer displacement thickness over said exposed surface, and the at least one particulate component being dispersed at a volume fraction that produces an average spacing between particles that corresponds to at least 1 but not more than 10 times said thickness.

22. The solid fuel of claim 1 wherein the at least one particulate component is dispersed at a volume fraction of at least 0.3 but not more than 0.8.

23. The solid fuel of claim 1 wherein the particulate material is distributed uniformly throughout the matrix.

24. The solid fuel of claim 1 wherein the particulate material is distributed as a continuously graded dispersion through the matrix.

25. The solid fuel of claim 1 wherein the particulate material is distributed as a discontinuously graded dispersion through the matrix.

26. The solid fuel of claim 1 wherein the size of the particulate material is nonuniform, and differently sized particles are distributed in different regions of the matrix.

27. The solid fuel of claim 1 wherein at least one particulate component is a mixture of two or more solid nonpolymeric organic compounds.

28. The solid fuel of claim 1 wherein at least one particulate component is a solid polymeric organic compound.

29. The solid fuel of claim 28 wherein at least one compound is an organic copolymer of at least two monomers.

30. The solid fuel of claim 1 wherein at least one particulate component is itself a solid fuel having a vaporization temperature higher than that of the matrix.

31. The solid fuel of claim 1 wherein at least one particulate component is a solid propellant.

32. The solid fuel of claim 1 wherein at least one particulate component is an organic explosive.

33. The solid fuel of claim 1 wherein at least one particulate component is an energetic organic compound containing up to 20% oxygen on a molar basis.

34. The solid fuel of claim 1 wherein the matrix comprises a solid nonpolymeric organic compound.

35. The solid fuel of claim 34 wherein the matrix comprises at least two solid nonpolymeric compounds.

* * * * *